United States Patent
Lavie et al.

(10) Patent No.: US 11,150,614 B2
(45) Date of Patent: *Oct. 19, 2021

(54) SYSTEM AND METHOD FOR SOCIAL TELEVISION MANAGEMENT OF SMART HOMES

(71) Applicant: COMIGO LTD., Yarkona (IL)

(72) Inventors: Motty Lavie, Raanana (IL); Yoav Gaziel, Tel Aviv (IL)

(73) Assignee: DOV MORAN HOLDINGS LTD, Yarkona (IL)

( * ) Notice: Subject to any disclaimer, the term of this patent is extended or adjusted under 35 U.S.C. 154(b) by 111 days.

This patent is subject to a terminal disclaimer.

(21) Appl. No.: 16/570,937

(22) Filed: Sep. 13, 2019

(65) Prior Publication Data
US 2020/0033818 A1 Jan. 30, 2020

Related U.S. Application Data (63) Continuation of application No. 13/804,545, filed on Mar. 14, 2013, now Pat. No. 10,416,615.

(60) Provisional application No. 61/611,024, filed on Mar. 15, 2012, provisional application No. 61/611,030, filed on Mar. 15, 2012, provisional application No. 61/643,372, filed on May 7, 2012, provisional application No. 61/643,375, filed on May 7, 2012.

(51) Int. Cl.
| | |
|---|---|
| *G05B 11/32* | (2006.01) |
| *H04L 12/28* | (2006.01) |
| *H04N 21/41* | (2011.01) |
| *H04L 29/06* | (2006.01) |

(52) U.S. Cl.
CPC ......... *G05B 11/32* (2013.01); *H04L 12/2816* (2013.01); *H04L 12/2834* (2013.01); *H04L 65/60* (2013.01); *H04N 21/4131* (2013.01); *H04L 2012/285* (2013.01); *H04L 2012/2849* (2013.01)

(58) Field of Classification Search
CPC .............................. G05B 11/32; H04L 65/60
USPC .......................................................... 700/90
See application file for complete search history.

(56) References Cited

U.S. PATENT DOCUMENTS

| | | | | |
|---|---|---|---|---|
| 2009/0150939 A1* | 6/2009 | Drucker | ................. | H04N 7/173 725/59 |
| 2009/0276713 A1* | 11/2009 | Eddy | ..................... | G06Q 30/00 715/733 |
| 2010/0011135 A1* | 1/2010 | Jawa | ..................... | H04L 67/025 710/19 |
| 2010/0185775 A1* | 7/2010 | Lee | ................... | H04N 21/43615 709/231 |
| 2010/0205628 A1* | 8/2010 | Davis | ................... | H04N 21/482 725/25 |
| 2010/0333019 A1* | 12/2010 | Oschwald | ........... | H04L 12/1822 715/810 |

(Continued)

*Primary Examiner* — Md Azad
(74) *Attorney, Agent, or Firm* — Momentum IP; Marc Van Dyke (57) ABSTRACT

The disclosure relates to a content-based control system for controlling a smart home. The control system includes a client terminal connectable to a media content provider and a home automation interface operable to connect with a smart home controller. The system may allow settings and ambience to be controlled according to current media content being consumed and the media consumers social environment.

20 Claims, 6 Drawing Sheets

(56) References Cited

U.S. PATENT DOCUMENTS

2012/0130513 A1\* 5/2012 Hao ..................... G05B 15/02
700/90

\* cited by examiner

SYSTEM AND METHOD FOR SOCIAL TELEVISION MANAGEMENT OF SMART HOMES

CROSS-REFERENCE TO RELATED APPLICATIONS

This application claims the benefit of priority from U.S. Provisional Patent Application 61/611,024 filed Mar. 15, 2012, U.S. Provisional Patent Application 61/611,030 filed Mar. 15, 2012, U.S. Provisional Patent Application 61/643,372 filed May 7, 2012, and U.S. Provisional Patent Application 61/643,375 filed May 7, 2012 the contents and disclosures of which are incorporated by reference in their entirety.

FIELD OF THE INVENTION

The disclosure herein relates to enhancing the television viewing or other media experience providing consumers with the ability to control the home environment based upon media content consumed. In particular, the disclosure relates to providing members of a social group, the capability of automatically setting the preferred ambience while watching television. The ambience setting may be determined by a combination of digital content viewed, personal preferences, influence of social network members and the like thereby enhancing television or the like as a social media.

BACKGROUND OF THE INVENTION

The term 'smart home' may refer to home automation environment, including functionality for automatically controlling home systems such as entertainment systems, lighting, shading, surveillance and safety, climate control, heating, ventilation, air conditioning, plant watering, electrical appliances, thermostats and others to provide improved convenience, comfort, energy efficiency and security.

The media viewing experience is growing ever more diverse with video content becoming available on various devices such as media renderers including television, personal computers, tablets, mobile communication devices, telephones, hand held devices and the like. In parallel, the social environment is changing, taking advantage of new emerging technologies and yielding a whole new world of experiences. Television broadcasting networks continue to deliver digital content in diverse areas of interest, answering different tastes and flavors. Combining the digital media, specifically the television as a platform, with the social environment increases the demand for sharing digital content and views.

No doubt, the television is a wide reaching vehicle and a highly significant player in the digital media content domain. Recent studies of consumer behavior and television measurements (eMarketer—Digital Intelligence, Nielsen) claim that 99% of American households watch television on a regular basis. Furthermore, the studies highlight the fact that the average duration of adults watching television is higher than online surfing; four and half hours per day compared to an average of just two and half hours per day. Additionally, the percentage of American homes having at least one television set is reaching 99%, with two thirds of them owning at least three sets. These numbers are highlighting the fact that television is still a most widespread and premier entertainment platform.

As the role of social interaction in the media experience increases, the disclosure herein relates to enriching the social experience combining advanced technology, television and social traits integrated into the smart house concept.

SUMMARY OF THE INVENTION

It is therefore according to one aspect of the current disclosure to present a content-based control system. The system may comprise: a processor configured to use a software application; a client terminal connectable to a media content provider and to a media renderer; a home automation interface operable to connect with a smart home controller; and a media renderer connectable to the media content provider.

As appropriate, the software application may comprise: a management module; a social configuration module, configured to manage the social space; an authorization module, configured to manage the assignment of permissions to members of the social spaces; and an integration module, configured to manage integration with the smart home controller.

Variously, the at least one media renderer is selected from the group consisting of a television, a tablet, a smartphone, a personal computer and laptop.

Where required, the smart home controller may be operable to control one or more household devices. Variously, the household devices may be selected from the group consisting of: a light, an air-conditioner, a window shade, a water boiler, coffee maker, an oven, a stove, a microwave, a popcorn maker, a phone, a washing machine and a dishwasher.

Optionally, the smart home controller may be operable to transmit controls to and receive input from one or more sensors. Variously, the sensors are selected from the group consisting of light sensors, sound sensors and motion sensors.

In some embodiments, the processor may be incorporated in the client terminal. Additionally or alternatively at least one processor may be remotely connected to the client terminal.

Where appropriate, the client terminal is connectable to the media content provider through a network based communication channel selected from the group consisting of internet based communication, cellular based communication and a combination thereof. Accordingly, the processor may be incorporated in a remote central unit.

It is according to a further aspect of the disclosure to teach a method for controlling ambience comprising the step of: engaging a current content; generating at least one ambience structure operable to generate an ambience based on at least one input structure; and transmitting the at least one ambience structure to generate a desired ambience, wherein the ambience structure is transmitted through a home automation interface to a smart home controller or a media renderer. Variously, the media renderer is selected from the group consisting of a television, a tablet, a smartphone, a personal computer and a laptop.

Optionally, the step of engaging a current content is selected from the group consisting of: activating a media renderer and selecting the current content for presentation in the media renderer.

As required, at least one ambience structure is generated based on one or a combination of input structures selected from the group consisting of the current content, a personal preference input, a content history input, a social network input, and a physical setting input, wherein: the personal preference input reflects viewing preference based on preference data; the content history input reflects viewing preference based on content viewing history; the social network input reflects collaborating information social spaces; and the physical setting input reflects the reading of at least one sensor connected to the smart home controller. Optionally, the physical setting input reflects the current reading of at least one sensor connected to the smart home controller. Optionally, the physical setting input reflects prior sensor readings for determining a preferred ambience. Optionally, again, the sensor is selected from the group consisting of a light sensor, a sound sensor, and a motion detector.

Where required, the at least one ambience structure may generate a desired ambience through controlling the function of at least one home device through the smart home controller. Accordingly, the home device is selected from a group consisting of a light, an air-conditioner, a window shade, a water boiler, coffee maker, an oven, a stove, a microwave, a popcorn maker, a phone, a washing machine and a dishwasher. Additionally or alternatively, the at least one ambience structure may generate a desired ambience through controlling a function of the media renderer. Accordingly, the media renderer may be selected from the group consisting of: screen brightness, and audio volume.

Optionally, the step of engaging a current content is selected from the group consisting of: activating a media renderer and selecting the current content for presentation in the media renderer.

It is according to a further aspect of the disclosure to teach a home ambience management software comprising: a management module configured to create an overlay superimposed upon the screen of a media renderer; a social configuration module, configured to manage one or more social spaces; an authorization module, configured to manage the assignment of permissions to members of said one or more social spaces; and an integration module, configured to manage integration with a smart home controller.

BRIEF DESCRIPTION OF THE DRAWINGS

For a better understanding of the embodiments and to show how it may be carried into effect, reference will now be made, merely by way of example, to the accompanying drawings.

With reference now to the drawings in detail, it is stressed that the particulars shown are by way of example and for purposes of illustrative discussion of selected embodiments only, and are presented in the objective of providing what is believed to be the most useful and readily understood description of the principles and conceptual aspects. In this regard, no attempt is made to show structural details in more detail than is necessary for a fundamental understanding; the description of the drawings making apparent to those skilled in the art how the various selected embodiments may be put into practice. In the accompanying drawings.

DETAILED DESCRIPTION OF THE INVENTION

As used herein, a user refers to an individual (or a group of individuals) operating a system of the disclosure or a component thereof (e.g., a client terminal) or performing a method of the disclosure.

As used herein, media content may be any information content that may be experienced by a user, including but not limited to television shows, radio shows, movies, video clips, slideshows, multimedia presentations, pictures, games, audio content, music, and the like. The media content may be digital media concent.

As used herein, a client terminal is a device that is operable to meet user defined preferences, monitor available media content and/or control the media content input to a media renderer. The client terminal may include, or be externally connected to, a digital video recorder (DVR). The client terminal may include, be externally connect to, or otherwise associated with a home automation interface operable to connect with a smart home controller. A client terminal may comprise, be connected to, be incorporated into or be otherwise associated with, without restriction, a television set, a set-top-box (STB), a desktop computer, a laptop computer, a tablet, a telephone, a mobile communication device or the like. A set-top box (STB) is an information appliance that connects to a television set and an external source of signal, decoding that signal into content that can be presented on a television screen or other display device as media content. The STB may be a cable television STB. As used herein, a DVR is a device that is capable of recording media content of various types; television programs, audio content, visual content, audiovisual content, multimedia content and the like, for example by saving them onto a recording device such as a hard drive for a later use. Such content may be subsequently used for playback, viewing, editing or the like. The DVR may variously include a local data storage unit, a remote data storage unit accessible by a media renderer client terminal or the like. The DVR may additionally or alternatively include a device configured for playback from VOD, DVD recorders, server based DVR's services and the like. Additionally, while recording, users may switch to view other television programs or to various other media modes. Various possible elements of the client terminal, e.g., a user interface, monitor, processor, controller, a home automation interface and the like be integrated within a single device, or distributed between two or more devices, which may be connected via wire or wirelessly.

As used herein, a media renderer is a device that is operable to present media content into a consumable form (e.g., visible, audible and the like). The media renderer may be one or a combination of, without restriction, television sets, monitors, speakers or the like. The media renderer may be a separate unit that is connected to the client terminal. Alternatively, the media renderer may be integrated together with the client terminal.

Devices or components that are "connected" or "connectable", as herein, may be connected or connectable to each other via a wired connection or a wireless connection, as variously known in the art.

Various developments have been made to provide television services on a social basis taking advantage of the relationship between individuals, connecting users watching common television content in different locations. The combination of a social network and digital media may enable the use of media renderers such as televisions as a social platform, for viewing broadcast digital content, while sharing views with a large social audience. Aspects of this disclosure combine social television with the concept of smart home and may provide new and advanced possibilities related to comfort and convenience while watching television programs.

Technologically, the implementation of the current disclosure may use advanced communication protocols as described hereinbelow. The present disclosure provides for a content-based control system, which may automatically adjust the ambience to the current digital content viewed, or present the possible ambience categories to be selected manually from the media renderer display using a remote controller, or additionally may use other input devices such as smartphones, tablets and the like.

The content-based control system may include: a client terminal having: a processor configured to use a software application; a client terminal connectable to a media content provider and to a media renderer; a home automation interface operable to connect a smart home controller; and a media renderer connectable to said media content provider. The content-based control system may further include a processor configured to use a software application, which may be incorporated in the client terminal or a remote central unit.

A client terminal (such as a STB) may comprise a home automation interface that is operable to connect (via wire or wirelessly) with devices within the local home, e.g., through a smart home controller adjusting the ambience to the digital content viewed, managed through the controlling mechanism of the smart home. The home automation interface may be, for example, connected to or embedded within, the client terminal. The home automation interface and/or the smart home controller may use products based on Zigbee or Z-Wave standards or the like. The smart home controller may be operable to control household devices such as a light, an air-conditioner, a window shade, and the like. The smart home controller may be further operable to transmit controls to and receive input from sensors, such as light sensors, sound sensors and motion sensors. The home automation interface may also send instructions to the media renderer (directly or via the controller) to control its operation, e.g., set the volume, screen brightness and the like. Alternatively or in addition, the smart home controller may be integrated within the client terminal.

Smart home, or home automation may enable controlling the digital home.

Advancement of technology and on-going continuous changes, bring more and various electronic devices into the household, impacting all aspects of our daily living and lifestyle. At the same time, broadband Internet access, home networks, more sophisticated computers and consumer electronics products are enabling better controlling of the home environment, providing advanced home-automation functionality.

Home automation refers to providing remote or automatic control of devices around the home. The automated system may control heating and cooling, lighting, entertainment systems (video and home audio), security and monitoring systems, communication (telephones and intercoms), yard watering and the like.

The concept of home automation relies on connecting all these systems and devices to provide convenience, safety and ability to control all home systems from a distance. For example, on leaving home, the home-automation system can automatically turn off the lights, close the shutters, lock the front door, arm the alarm system and close the garage door. It may also, upon powering on the TV or the DVR player to automatically dim the lights, draw the shades, operate a projector, lower a projection screen, initiate a speaker system, redirect incoming calls to voicemail or the like.

These scenarios may be preprogrammed to adjust response to such events automatically occurring at a specific time of the day, for example, sensed by detectors or sensors or triggered through user input interface. Most homes will have various ways to access and control systems, from using a universal remote to touch screens, wired or wireless networked. Emerging technologies may also enable controlling home systems from mobile devices such as a cell phone or PDA, or using tablets and the like. Detectors and sensors may be components provided to enable monitoring and detection of events, triggering the desired functionality. For example, motion detectors may serve in energy savings by turning off the lights and air conditioning when no motion is detected. At the same time, the lights may automatically turn on in response to motions, reinforcing the sense of security when entering the home at night.

A known existing technology used in home-automation is the X-10, a power-line technology, using the home's electrical wiring and outlets. X-10 mainly provides functionality for lighting, appliances and security. Insteon, is a dual-band technology, using both power line and radio frequency (RF), designed to replace the X-10 older technology while being backward compatible. Additionally, other technologies such as Zigbee and Z-Wave, for example seem to play an significant role. Both are based on RF wireless, but Zigbee may seem to have the advantage as it is based on an open specification (IEEE 802.15.4) and has the backup of Zigbee Alliance, lining up companies planning to use the technology. ZigBee Home Automation is offering a global standard for interoperable products helping in controlling the variety of aspects of a smart home. Z-Wave uses simple, reliable, low-power radio waves that easily travel through walls, floors and cabinets. Z-Wave control can be added to almost any electronic device in a house, building internal home Z-Wave networked.

Combining social television and smart home may be related to enhanced experience of watching television. It may also be integrated into a comprehensive interactive social television, for example, such as described in the applicants co-pending applications relating to group purchasing U.S. Ser. No. 61/607,615, hybrid advertising U.S. Ser. No. 61/605,220 and social DVR U.S. Ser. No. 61/607,617. The content-based control system of the present disclosure may communicate with the smart home controller, in order to generate the desired ambience or physical setting. The desired ambience may be generated through one or more ambience structures, which may be composed of different set of commands needed to generate the ambience through the smart house controller and/or through controlling the media content output of the media renderer. The ambience structure may comprise specific commands, which may be communicated through a specific network type of products under the context of the smart home architecture (Zigbee, Z-Wave and the like), as described hereinabove. For example, the ambience structure may include commands serving the purpose of dimming the lights, drawing the curtains, or setting the speakers' volume accordingly. Further, the ambience structure may include commands controlling other home device activities may affect the experience of a user, such as activating food preparation devices (e.g., activating a water boiler, coffee maker, an oven, a stove, a microwave, a popcorn maker and the like), stopping or adjusting the activity of devices that may be sources of extraneous sound (e.g., phone, washing machine, dishwasher and the like).

Variously, an ambience function, referred to herein, refers to a function that determines the ambience structure based upon one or more input structures, where each input structure represents an input category needed for calculating a desired ambience. These input categories may include personal preferences of user, digital content viewed (such as content currently being viewed and content previously viewed) and social definitions coming from the members of social groups and the like.

For example, the ambience function A, may produce an output having one or more different ambience structures such as AM1, AM2 through to AMn, each representing a set of commands for generating a desired ambience. The home automation interface may communicate the ambience structures to the smart home controller and/or the media renderer. The ambience structures may generate a desired ambience through controlling the function of home devices through the smart home controller, such as a light, an air-conditioner, a window shade, and the like. The ambience structures may further generate a desired ambience through controlling the function of the media render, such as controlling screen brightness, audio volume, and the like.

Furthermore ambience structures AM may be directed towards determining settings in a smart home environment as required. For example, one example of an ambience structure may be directed towards setting a water heater to switch on at a suitable time such that hot water is available for a media consumer after viewing a particular show. In another example of an ambience structure, a kettle may be set to prepare hot water before a half time break of a sports match. In still another example, a noisy appliance may be set to pause or delay commencement so that its noise does not disturb a media consumer. Still other examples of settings related ambience structures will occur to those skilled in the art.

The ambience function A may use one or more types of input structures, such as personal preferences PP, current content input CC, content history input CH, social network input SN, physical setting PS, current time CT and the like. The function may be represented as:

A{CC, PP, CH, SN, PS, CT . . . }=AM1, AM2, . . . AMn

The configuration of the viewing ambience, e.g., the determination of one or more ambience structures AM, may take into account the media content being currently viewed, i.e., based on a current content input CC. As such, the configuration of the viewing ambience may comprise content awareness.

The personal preferences input PP may be automatically configured, and/or manually adjusted to reflect the user's viewing preferences based on preference data and may be stored in the user profile. Constructing the personal preferences input PP automatically for use in the ambience function may require the use of machine learning algorithms to deal with its complexity and high dimensionality and may also require statistical analysis. Additionally or alternatively, the automatic configuration process may generate a score for each media content item of interest, for example, based on a number of watching times or the like, to construct the content history input CH, which reflects viewing preference based on viewing history. Additionally, the content input CH may also take into account VOD (Video on Demand) sessions, time-shifted television watching using DVR, gaming and the like to form the input values of the social network structure.

Constructing the content input CH automatically for use in the ambience function may require the use of machine learning algorithms to deal with its complexity and high dimensionality and may also require statistical analysis. As such, the configuration of the viewing ambience may comprise content awareness.

Additionally or alternatively, the configuration process may be expanded to include collaborating information of its social spaces, if the architecture is network-based, to produce a social network input SN. Thus, it may include the collection of data which may be classified, for example, according to various preferences, tastes or interests of social spaces, connecting users sharing a common television set or simultaneously viewing the same content on separate television sets or in different locations. Constructing the social network input SN automatically for use in the ambience function may require the use of machine learning algorithms to deal with its complexity and high dimensionality and may also require statistical analysis. As such, the configuration of the viewing ambience may comprise social awareness.

Additionally or alternatively, one or more sensors may be provided to monitor the local physical setting input PS. Data from the sensors relating to the local physical setting, e.g., connected to the smart home controller, may be utilized to provide additional input into an ambience function to determine said one or more ambience structures, or to determine other physical attributes for the setting of media consumption. The physical setting input PS may take into account the current sensor readings, for adjusting the ambiance structures AM accordingly. Additionally, the physical setting input PS may take into account prior sensor readings, in order to, e.g., determine a preferred ambience. The sensor may be, e.g., a light sensor, a sound sensor, a motion sensor and the like.

Accordingly, the viewing setting may be determined by a combination of personal preferences, media content, social network and physical setting. By way of example of determining a viewing ambience based on physical setting, if a sensor determines that a viewer is alone, a certain set of viewing options may be provided, for example on a default television screen. If an environmental sensor input indicates a group of viewers, in combination with a media type such as a sports match, an instruction may be sent to operate a projector and to lower a projection screen for example, so as to provide a suitable environment for group viewing.

In other scenarios, sensors may use sensors to determine which viewing screens to operate based upon the geographical location of the occupants. Where sensors are able to identify individual viewers personal preferences or combinations of multiple personal preferences may be used to determine environmental conditions accordingly.

Aspects of this disclosure may be based on technological infrastructure for controlling media renderers such as televisions, tablets, telephones, computers or the like, according to content available, user preferences and social information mechanisms. People socialize within a shared social space. The methods and systems of communication between television viewers, with current disclosure implementation of automatic setting of the preferred ambience, while watching television, may better facilitate the television as a real social engagement platform. As such, a desired ambience of one user may be shared with other users. That is, a first user associated with a first client terminal, which constructs an ambience as defined by one or more ambience structures may invite a second user to import said ambience into a second client terminal.

The interaction with the user via a user friendly interface may be driven by a management module. Additionally, it may work in different possible architectures, for example, using a network based approach to allow remote activities.

Where required, a dedicated smart-home ambience module may be provided specifically to manage such functionality as a stand-alone application. Alternatively or additionally, the application may be integrated with other features of a social platform, for example, such as described in the applicants co-pending applications relating to group purchasing U.S. Ser. No. 61/607,615, hybrid advertising U.S. Ser. No. 61/605,220 and social DVR U.S. Ser. No. 61/607,617.

The software application, which may be run in at least one data processing unit in a client terminal of the control-based control system of the present disclosure may be a smart home ambience management software. The architecture of the smart home ambience management software may include various functional modules such as a management module, a social configuration module, an authorization module, an integration module and the like. Optionally and additionally, the smart house ambience management software may be integrated into other expanded social media platforms.

The management module may control the ambience setting functionality, data reception and communications with the other modules. Additionally, the media management system may be configured to create an overlay superimposed upon the screen of a television set or other media renderer to communicate related information to the user via.

The social configuration module may be configured to manage the social space, and allow the social environment to be configured to suit requirements. For example, configuring of the social environment may include the creation of social groups, adding or removing members of social groups, defining permissions, editing related social information of members or the like. The social configuration module may be implemented to provide lightweight and basic architecture or optionally, may be integrated with other social modules, as described hereinabove.

The authorization module may be provided to manage the assignment of permissions to members of the social spaces.

The integration module may be provided to manage the integration with the smart home controller, to control the home automated systems accordingly.

In various embodiments of the disclosure, one or more tasks as described herein may be performed by a data processing unit, such as a computing platform or distributed computing system for executing a plurality of instructions. Optionally, the data processing unit includes or accesses a volatile memory for storing instructions, data or the like. Additionally or alternatively, the data processing unit may access a non-volatile storage, for example, a magnetic hard-disk, flash-drive, removable media or the like, for storing instructions and/or data.

Optionally, with the introduction of Wi-Fi integrated chipset into televisions, enhanced user interface may use smart phones, tablet or other sophisticated devices to make the smart home interactive experience easier and friendlier, enriching implementation functionality.

Optionally, a system may include a client terminal such as a set-top-box, mobile communication device or the like, which is operable to meet user defined preferences, monitor available media content and control the input media renderer, accordingly.

A set-top box (STB) is an information appliance that connects to a television set and an external source of signal, decoding that signal into content that can be presented on a television screen or other display device.

Figure 1:
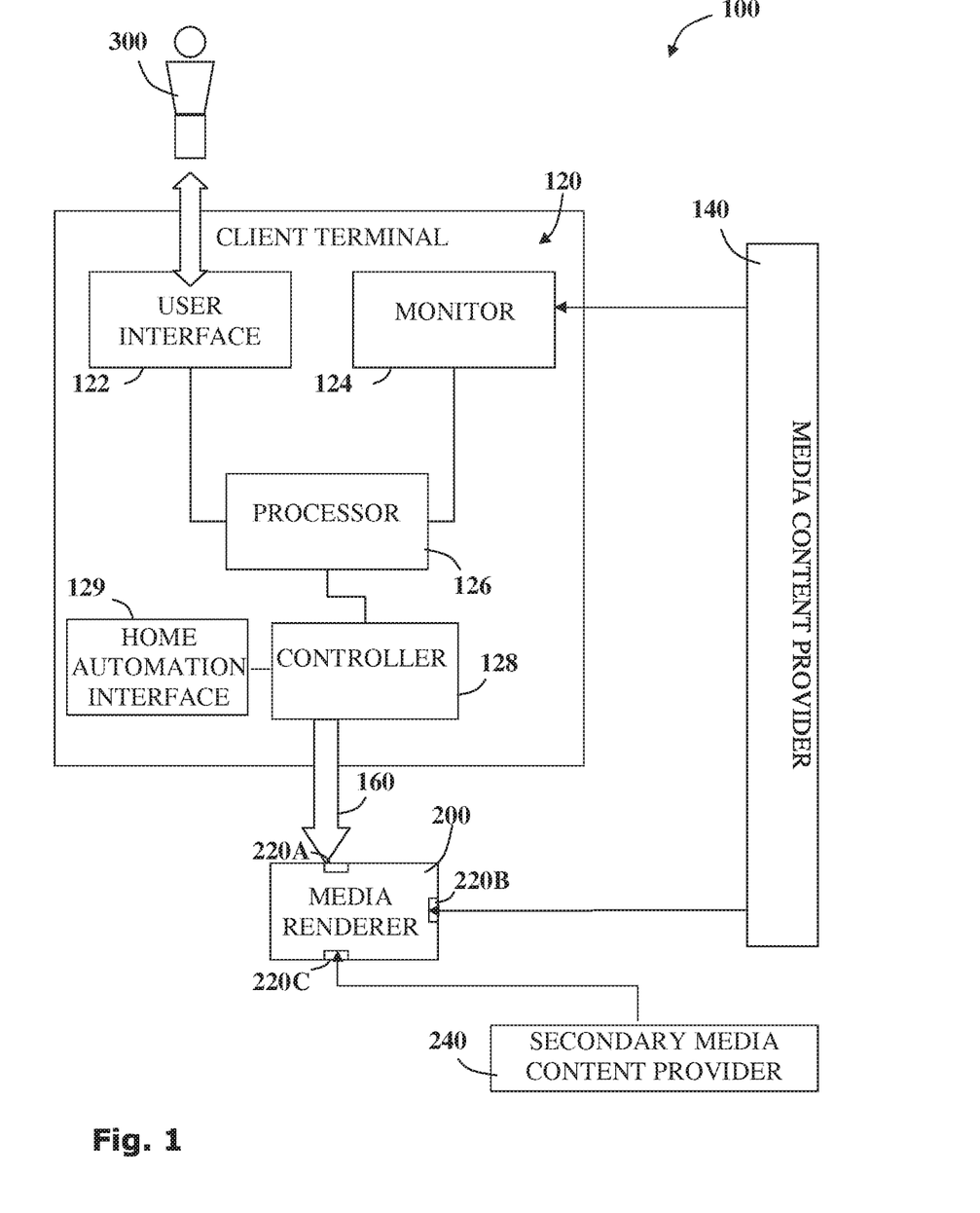
FIG. 1 is a block diagram representing one possible configuration of selected elements of a system for content based management of a media renderer with local processing of smart home ambience control.

With reference to FIG. 1, showing a block diagram representing the main components of one possible configuration of selected elements of a system 100 for content based control of a media renderer 200. The system 100 includes a client terminal 120 connected to a media content provider 140 and further connected to the media renderer 200 via a communication channel 160. The client terminal 120 includes a processor 126 and may include additional components such as a controller 128, a user interface 122 and a media monitor 128.

Optionally, a user interface 122 of the client terminal 120 may be used to allow a media consumer (e.g., a user) 300 setting preferences to be used by the system 100 selecting control signals sent to the media renderer 200. Various user interfaces 122 are known in the art such as keyboards, touch screens, remote controls, pointing devices, eye trackers, gesture capture devices, wired gloves, depth-aware cameras, stereo cameras and the like and may be used to input data to the client terminal 120. Optionally, the media renderer 200 itself may serve as at least part of the user interface 122, for example, by providing an output screen or input device.

The processor 126 of the content-based control system 100 is operable to receive media content data from the media-monitor 124, and to record a user profile related to media content accessed. The processor 126 may further select control signals, which the controller 128 may send to the media renderer 200.

The client terminal 120 may further comprise a home automation interface 129 that is operable to connect (via wire or wirelessly) with components within the local home such as lights, sensors and the like, to control the local home, adjusting the ambience to the digital content viewed, managed through a controlling mechanism of a smart home. The home automation interface 129 may be, for example, connected to or embedded within, the controller 128. The home automation interface 129 may be based on Zigbee or Z-Wave standards or the like. The home automation interface 129 may also send instructions to the media renderer 200 (directly or via the controller) to control its operation, e.g., set volume, screen brightness and the like.

It is noted that the media renderer may comprise a plurality of connector ports 220A-C which may be connected to a number of media sources. For example, a first port 220A may be connected to the client terminal 120, a second port 220B may be connected to the media content provider 140 and a third port 220C may be connected to a secondary media content provider 240.

Various elements of the client terminal 120, e.g., the user interface 122, monitor 124, processor 126, controller 128 and the home automation interface 129 may be connected with each other as needed. Further, the various elements of the client terminal 120 may be integrated within a single device, or distributed between two or more devices, which may be connected via wire or wirelessly. Further, the media renderer 220 may be a separate device from the client terminal 120, or alternatively, integrated into a single device with the client terminal 120.

The filtering and recommendation of the television social functionality categories may be controlled by a user profile, for example, generated by a software package running on the client terminal processor 126, or customized manually. Such a profile may reflect the categories and preferences of viewing throughout the day and may indicate potential desired product or service for the user. The profile may be stored locally or may be sent to the media content provider for remote storage. The product/service offering stream to the client terminal may be filtered or adjusted to suit user profile to meet social functionality preferences.

In some embodiments, a media stream may be accessed directly by a media renderer, for example, via the second input port 220B. It will be appreciated that where the client terminal is connected to the media renderer 200 via the first port 220A, it will not have control over content accessed via the second input port 220B.

By way of illustration only, control signals may use the Consumer Electronics Control (CEC) feature available, for example, with HDMI connections or the like. The CEC feature may provide a controller 128 to command and control the media renderer 200 by sending control signals via the client terminal 120. For example, CEC Routing Control allows a user to control the switching of signal sources between input channels.

Where required, the controller 128 may be operable to send control signals switching the input channel of the media renderer 200 to the first input port 220A as required. Accordingly, a personalized advert stream may be sent from the client terminal 120 to the media renderer 200 via the first input port 220A for the duration of the advertising break in the media content stream. Optionally the system may be further operable to switch access back to the second port 220B at the end of the advertising break, alternatively, the media content stream may be provided to the media renderer 200 via the client terminal 120.

Figure 2:
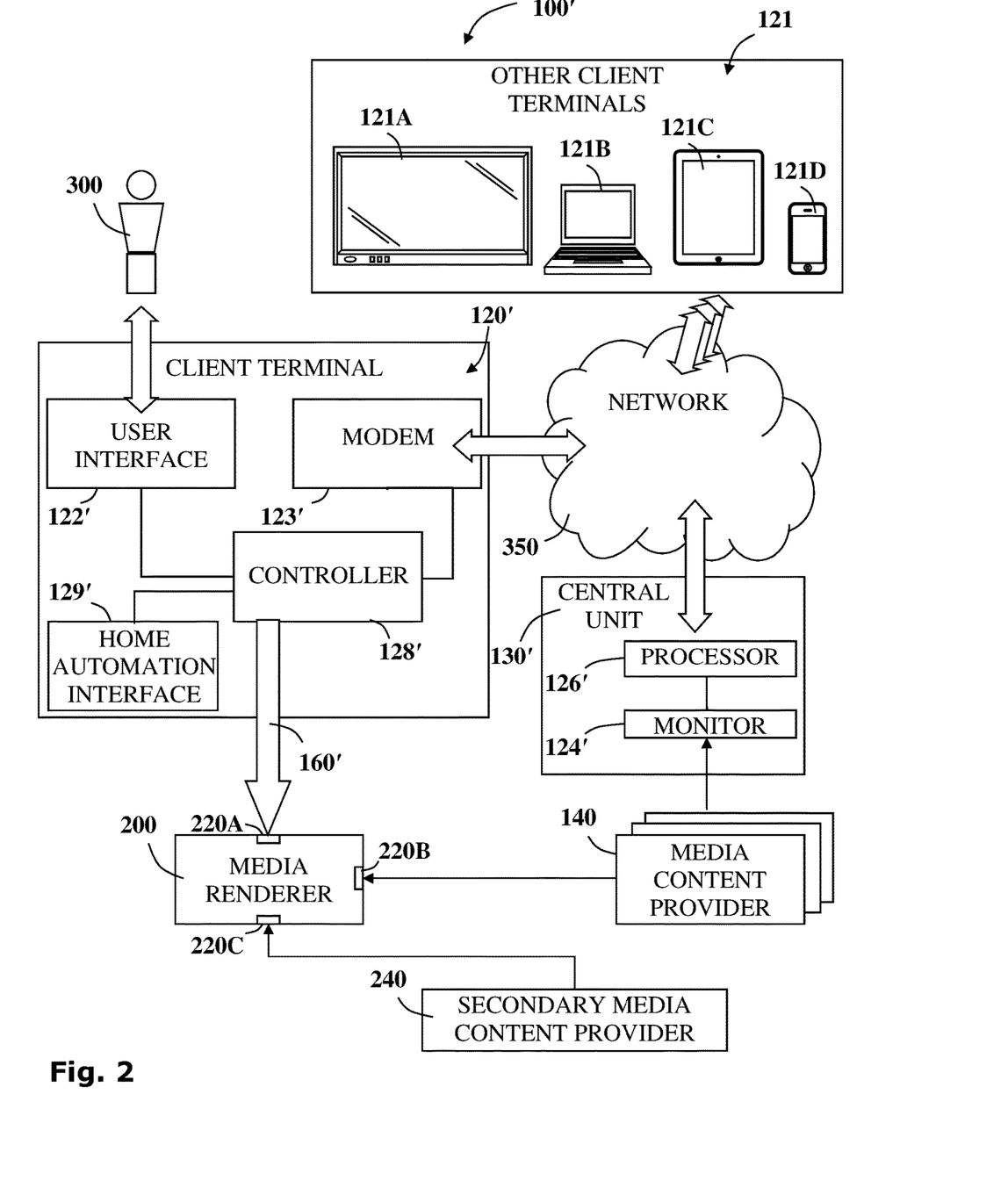
FIG. 2 is a block diagram representing another possible configuration for a distributed network-based system for content based management of a media renderer with central processing of smart home ambience control.

Referring now to FIG. 2, showing another possible block diagram configuration for network-based distributed system 100' for content based control of a media renderer 200 with added functionality of social spaces applications, centrally processed and managed. The network-based distributed system 100' includes a client terminal 120' and a central unit 130' in communication with a network 350, such as the World Wide Web, a cellular based communications network, a local area network or the other such networked computing system (or combinations thereof).

The system 100' includes a client terminal 120' in communication with a media content provider 140 connecting to the media renderer 200 via a communication channel 160'. The client terminal 120' may include components such as a controller, a user interface 122' a modem 123' and processors as needed.

Optionally, a user interface 122' of the client terminal 120 may be used to allow a media consumer (e.g., a user) 300 to set preferences to be used by the system 100' selecting control signals sent to the media renderer 200. Various user interfaces 122' are known in the art such as keyboards, touch screens, remote controls, pointing devices and the like and may be used to input data to the client terminal 120'. Optionally, the media renderer 200 itself may serve as at least part of the user interface 122', for example, by providing an output screen or input device.

The controller 128' of the content-based control system 100' is operable to receive media content data from the modem 123', and to record a user profile related to media content accessed. The controller may further select control signals, which the controller 128' may send to the media renderer 200.

The client terminal 120' may further comprise a home automation interface 129' that is operable to connect (via wire or wirelessly) with automation-enabled home devices as lights, sensors, and the like, to control the local home, adjusting the ambience to the digital content viewed, managed through a smart home controller. The home automation interface 129' may be, for example, be connected to or embedded within, the controller 128'. The home automation interface 129' may be based on Zigbee or Z-Wave standards or the like. The home automation interface 129' may also send instructions to the media renderer 200 (directly or via the controller) to control its operation, e.g., set volume, screen brightness and the like.

Various elements of the client terminal 120', e.g., the user interface 122', modem 123, controller 128' and the home automation interface 129' may be connected with each other as needed. Further, the various elements of the client terminal 120' may be integrated within a single device, or distributed between two or more devices, which may be connected via wire or wirelessly. Further, the media renderer 200 may be a separate device from the client terminal 120', or alternatively, integrated into a single device with the client terminal 120'.

The central unit 130' may provide specific functionality of group recording processing of the system 100' to be performed remotely and communicated to the client terminal 120' via a modem 123' providing a connection to the network 350. For example, the central unit 130' may be operable to receive media content data from a media-monitor 124', and to record a user profile related to media content accessed. The central unit 130' may further have a processor 126' receiving information, such as the current viewer preferences profile (with targeting characteristics) created locally on the client terminal 120' or TV associated events from the client terminal 120' to process and update user preference profile (with targeting characteristics) on the central unit 130', controlling social application related content sent to this client terminal.

The modem 123', as used herein, may refer to any device, mechanism or component that is operable to connect or communicate with the network 350, such as the internet and the like.

It is noted that for network-based architecture as indicated in FIG. 2, some of the analytics may be performed on the controller of the terminal client. This may, for example, establish and maintain a local user preference profile. Alternatively or additionally, the system may send data pertaining to a viewer's watching behavior to the central unit and a user preference profile may be generated and maintained remotely.

It is further noted that a number of different client terminals 121 may access a common central unit 130' possibly via a network 350 such as the internet or the like. Accordingly, a social set of users using a variety of client terminals such as televisions 121A, computers 121B, tablets 121C, telephones 121D or the like, may be connected via the common central unit 130' as described herein.

Although only two different architectures are described herein, those skilled in the art will appreciate that other technologies may be used to implement the method of controlling group recording.

For illustrative purposes only and better explain possible applications of the disclosure the following examples are presented. It is noted that the selection of applications is not to be considered exhaustive and that other applications will occur to those in the art.

Figure 3:
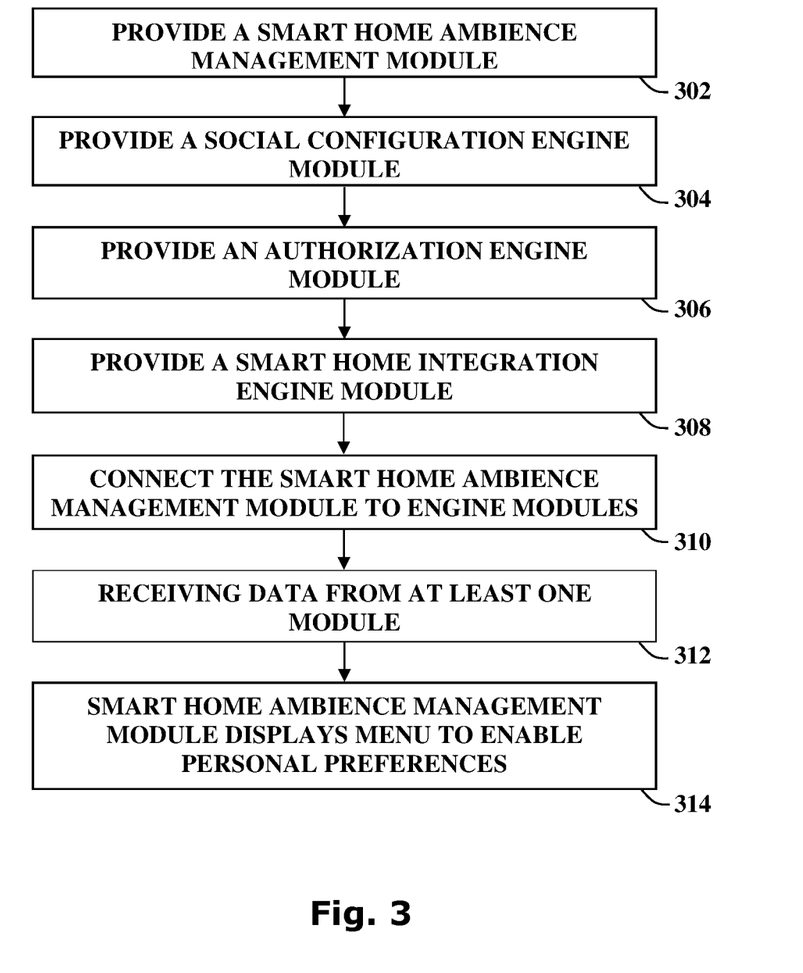
FIG. 3 is a flowchart representing possible formation of modules to support the disclosure of smart home ambience functionality.

Referring to the flowchart of FIG. 3, a method is disclosed for managing smart home ambience. The method includes the steps: providing a smart home ambience management module 302; providing a social configuration engine module 304; providing an authorization engine module 306; providing a smart home integration engine module 308; connecting the smart home ambience management module to the engine modules including the social configuration module, the authorization module and the integration module 310;

receiving data from other engine modules, typically via the management of ambience module 312; and the smart home ambience management module presenting an output menu to a user to enable creating and managing smart home ambience functionality 314.

Figure 4:
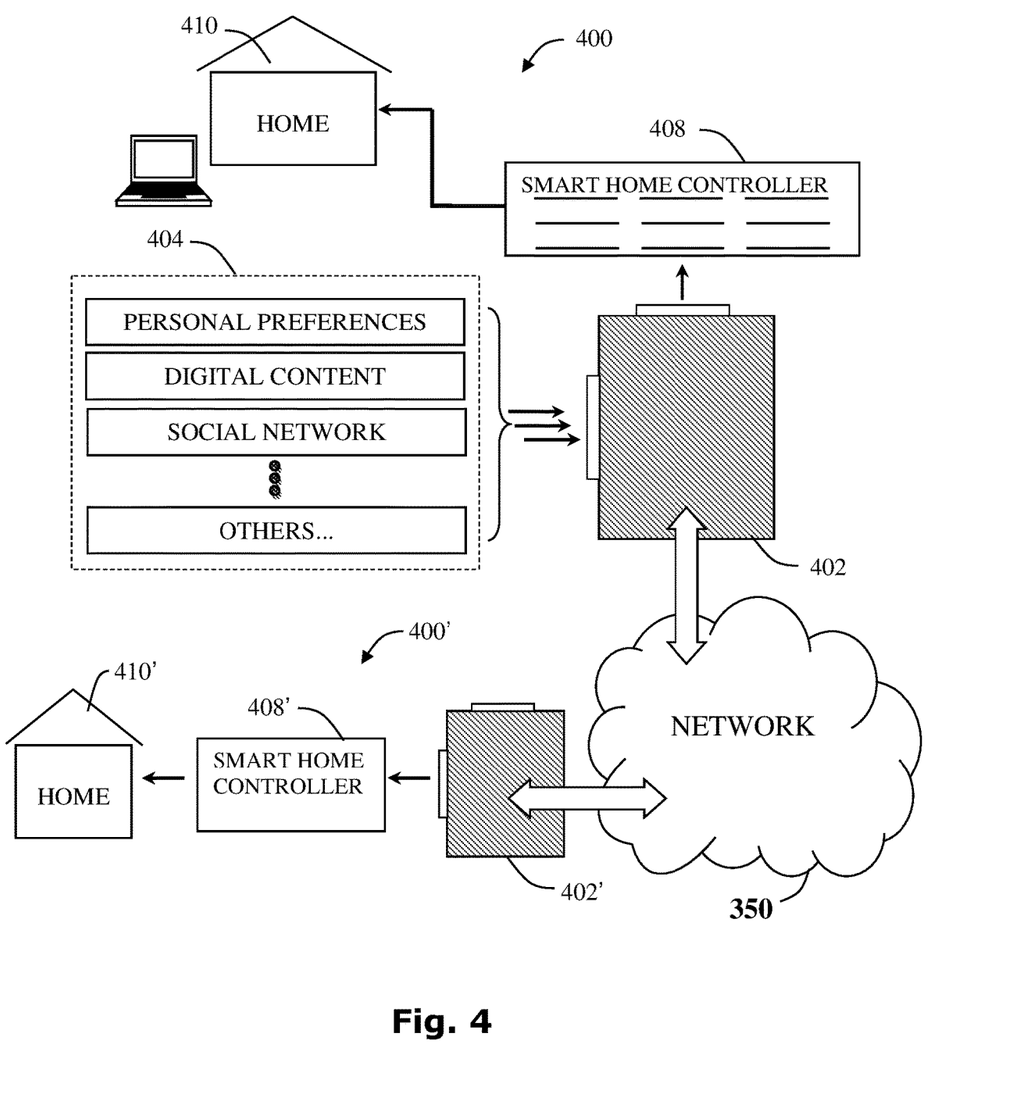
FIG. 4 is a block diagram representing selected components providing possible flow of interactions to impact the smart house controller.

Referring to the block diagram of FIG. 4, a possible structure is presented for a smart home ambience configuration system 400, as may be configured in the current disclosure.

The structure may include a social media engine platform 402, which may comprise the content-based control system of the present disclosure (e.g., content-based control system 100 or content-based control system 100'), an input stream 404 that may provide input for personal preferences structure, digital component structure, social network input structure and additional parameters. The input stream 404 may be provided through, e.g., a media consumer (e.g., through a user interface in a client terminal), a media content provider, a network such as the internet, and the like, as described herein. The social media engine platform may perform calculations to define the ambience, broken into specific commands such as ambience structures. These commands may be sent to the smart home controller 408 (through, e.g., a home automation interface, as described herein) to activate the different smart home systems of the house 410.

Where the social media engine platform 402 is network based (e.g., comprising a networked content-based control system such as the content-based control system 100'), the smart home ambience configuration system 400 may be operable to communicate through a network 350 with one or more other smart home ambience configuration systems 400', in order to define the ambience therein through commands sent to the remote smart home controller 408' to activate the different smart home systems of the remote house 410'.

Additionally and alternatively, media inputs may flow constantly into the social media platform, and thus may reflect live changes while watching the specific digital content, or switching to another channel, program or similar media such as gaming and the like.

Figure 5:
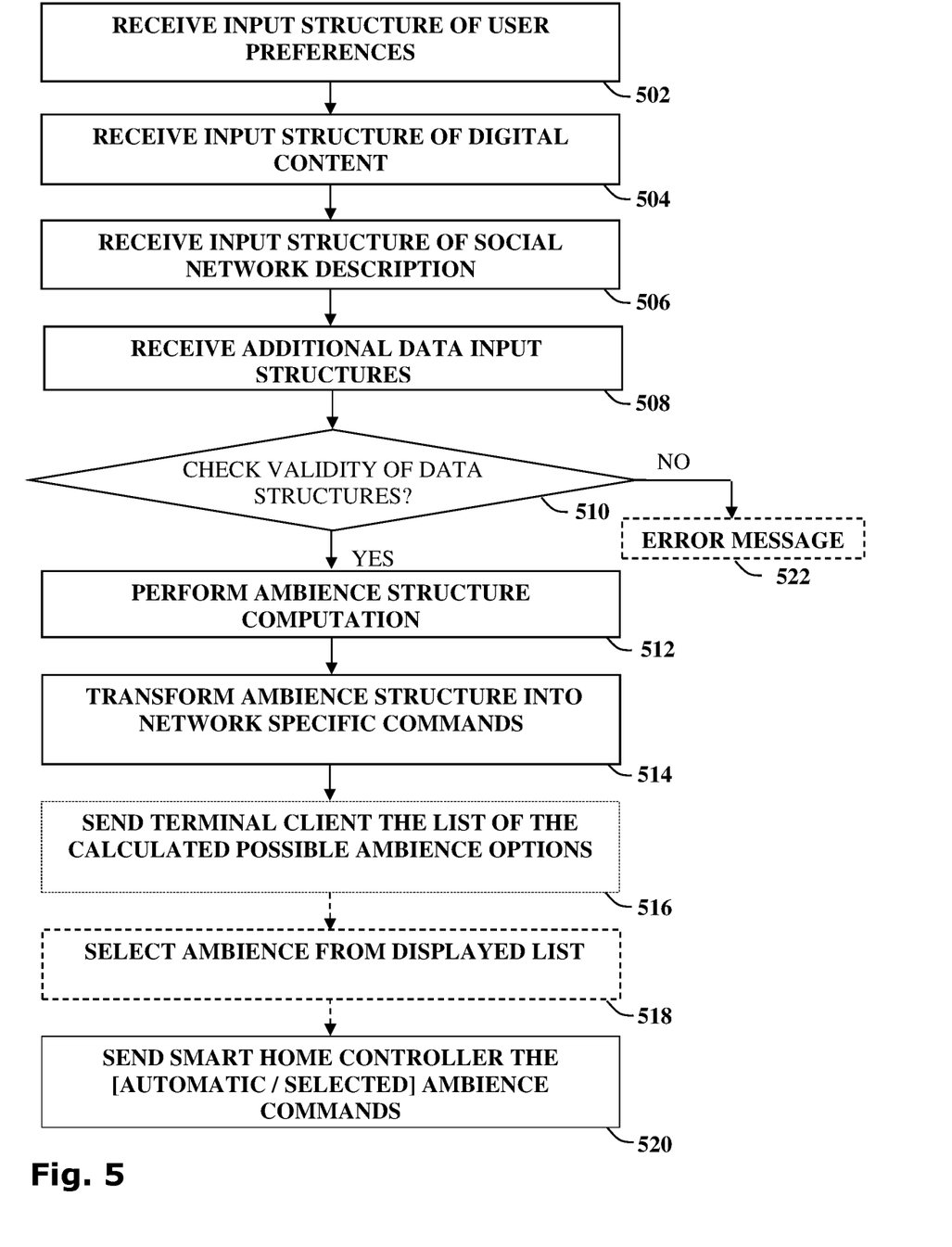
FIG. 5 is a flowchart representing selected actions of a method for software automatic interaction upon user request or of displaying selected ambience settings.

Referring now to the flowchart of FIG. 5, various selected actions are illustrated of a possible method for creating the set of commands to control the smart home with the appropriate ambience. It will be appreciated that other methods may also be used. The method may be used in a smart home ambience management system such as described herein and may be related, for example, with a management system such as described in the applicants co-pending application relating to group purchasing U.S. Ser. No. 61/607,615, hybrid advertising U.S. Ser. No. 61/605,220 and social DVR U.S. Ser. No. 61/607,617.

According to the method, an input structure is received of the user viewing preferences—step (502). Optionally, an input structure is received of television digital content—step (504). Optionally, an input structure is received of social spaces information —step (506). Optionally, an input structure is received of additional data—step (508). Accordingly, a validity check is performed to verify the data integrity—step (510). If the data passes validation, the social media engine performs the ambience computation—step (512). If the data fails validation, the system may try to assign automatic corrections. Optionally, an appropriate message may be sent to the client terminal to indicate a data validity error—step (522).

The resulting computed ambience structures, may be transformed into specific commands of the specific network supported, such as ZigiBee, Z-Wave and the like—step (514) and sent to the smart home controller to activate the specific home systems—step (520).

Optionally, the list of computed ambience options may be sent to the client terminal for display—step (516).

Optionally, the user may select any one of the displayed ambience and enforce the selected option—step (518).

Figure 6:
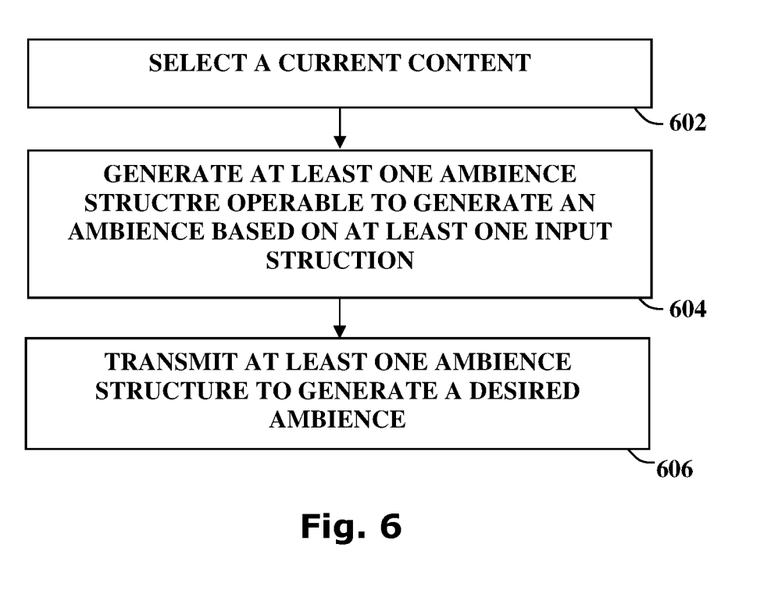
FIG. 6 is a flowchart representing selected actions of a method for controlling ambience.

Reference is now made to the flowchart of FIG. 6, showing selected actions of a method for controlling ambience having the steps of: engaging a current content (602); generating at least one ambience structure operable to generate an ambience based on at least one input structure (604); and transmitting said at least one ambience structure to generate a desired ambience (606), wherein the ambience structure is transmitted through a home automation interface to a smart home controller or a media renderer. The media renderer may be, e.g., a television, a tablet, a smartphone, a personal computer or a laptop.

The step of engaging a current content may comprise any activity that results in the presentation of the current content, including but not limited to activating a media renderer, selecting the current content for presentation in a media renderer, and the like.

The ambience structure, as described herein, may be generated based upon one or a combination of input structures such as the current content, a personal preference input, a content history input, a social network input, and a physical setting input. The personal preference input may reflect a viewing preference based on preference data. The content history input may reflect a viewing preference based on content viewing history. The social network input may reflect collaborating information social spaces. The physical setting input may reflect the reading of at least one sensor connected to the smart home controller. The physical setting input may reflect the current reading of at least one sensor connected to the smart home controller and/or the physical setting input reflects prior sensor readings for determining a preferred ambience.

The ambience structure may be operable to generate a desired ambience through controlling the function of at least one home device through the smart home controller. The home device may be any network-enabled device in a home, such a light, an air-conditioner, a window shade or the like. Other network-enabled home devices that may be controlled by said ambience structures include a water boiler, coffee maker, an oven, a stove, a microwave, a popcorn maker, a phone, washing machine and a dishwasher. Alternatively or in addition, the ambience structure may generate a desired ambience through controlling a function of the media renderer, such as screen brightness, audio volume or the like. window shade, The methods and systems described herein may be deployed in part or in whole through a machine or device that executes computer software, program codes, and/or instructions on a processor. The processor may be part of a server, client, network infrastructure, mobile computing platform, stationary computing platform, or other computing platform. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and systems described herein may be deployed in part or in whole through a machine that executes computer software on a server, client, firewall, gateway, hub, router, or other such computer and/or networking hardware.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, tablets, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

The methods and systems described herein may transform physical and/or or intangible items from one state to another. The methods and systems described herein may also transform data representing physical and/or intangible items from one state to another. The elements described and depicted herein, including in flow charts and block diagrams throughout the figures, imply logical boundaries between the elements. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The scope of the disclosed embodiments may be defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A method for controlling a home ambience using a smart home controller in communication with at least one home device and with a client terminal, the method comprising:
    a) determining, by the client terminal, media content being input to a media renderer;
    b) selecting, by the client terminal, a desired home ambience in accordance with the determined media content and in accordance with a stored personal preference of a user;
    c) automatically selecting, by the client terminal, at least one command according to the desired home ambience; and
    d) sending, by the client terminal, the at least one command to the smart home controller, thereby causing the smart home controller to instruct the at least one home device to operate according to the desired home ambience.

2. The method of claim 1, wherein the selecting of the desired home ambience comprises automatically selecting the desired home ambience.

3. The method of claim 1, wherein the selecting of the desired home ambience comprises displaying a confirmation request to the user.

4. The method of claim 1, wherein the selecting of the desired home ambience comprises (i) displaying multiple possible ambience options, and (ii) receiving from the user a selection of one of the multiple possible ambience options that is to be the desired home ambience.

5. The method of claim 1, wherein the media renderer is packaged within the client terminal.

6. The method of claim 1, wherein the media renderer is separate from the client terminal.

7. The method of claim 1, wherein the at least one home device includes a specific home device that is selected from the group consisting of: a light, an air-conditioner, a window shade, a water boiler, a coffee maker, an oven, a stove, a microwave, a pop-corn maker, a phone, a washing machine and a dishwasher.

8. The method of claim 1, wherein the at least one home device includes a specific home device that is noisy, and the sending of the at least one command causes the smart home controller to instruct the specific home device to stop activity, adjust activity, pause activity, or delay commencement of activity.

9. The method of claim 1, wherein the media renderer is selected from the group consisting of a television, a tablet, a smartphone, a personal computer and a laptop.

10. A client terminal for controlling a home comprising:
    a) a processor operable to monitor media content played by a media renderer;
    b) a smart home interface operable to connect with a smart home controller, wherein the smart home controller is in communication with at least one home device;
    c) a smart home ambience management software application executable by the processor, which when executed by the processor carries out the following steps:
        i) determine media content being input to the media renderer;
        ii) select a desired home ambience in accordance with the determined media content and in accordance with a stored personal preference of a user;
        iii) automatically select at least one command according to the desired home ambience; and
        iv) send the at least one command to the smart home controller, thereby causing the smart home controller to instruct the at least one home device to operate according to the desired home ambience.

11. A method for controlling a home ambience using a smart home controller in communication with at least one home device and with a first client terminal associated with a first member of a social group, the method comprising:

a) receiving, by the first client terminal, input from a second client terminal which is in communication with the first client terminal via a network external to the home and is associated with a second member of the social group or from a remote central unit which is in communication with the first client terminal via a network external to the home;

b) selecting, by the first client terminal, a desired home ambience in accordance with the received input;

c) automatically selecting, by the first client terminal, at least one command according to the desired home ambience; and d) sending, by the first client terminal, the at least one command to the smart home controller, thereby causing the smart home controller to instruct the at least one home device to operate according to the desired home ambience.

12. The method of claim 11, wherein the selecting of the desired home ambience comprises automatically selecting the desired home ambience.

13. The method of claim 11, wherein the selecting of the desired home ambience comprises displaying a confirmation request to the first member of the social group.

14. The method of claim 11, wherein the selecting of the desired home ambience comprises (i) displaying multiple possible ambience options to the first member of the social group, and (ii) receiving from the first member of the social group a selection of one of the multiple possible ambience options that is to be the desired home ambience.

15. The method of claim 11, wherein the at least one home device includes a specific home device that is selected from the group consisting of: a light, an air-conditioner, a window shade, a water boiler, a coffee maker, an oven, a stove, a microwave, a pop-corn maker, a phone, a washing machine and a dishwasher.

16. The method of claim 11, wherein the at least one home device includes a specific home device that is noisy, and the sending of the at least one command causes the smart home controller to instruct the specific home device to stop activity, adjust activity, pause activity, or delay commencement of activity.

17. The method of claim 11, wherein the receiving of the input comprises receiving the input from the second client terminal.

18. The method of claim 11, wherein the receiving of the input comprises receiving the input from the remote central unit.

19. The method of claim 18, wherein the input from the remote central unit is based on an input received by the remote central unit from the second client terminal.

20. The method of claim 18, wherein the input from the remote central unit is generated based on data selected from the group consisting of: data about media content currently played by a media renderer associated with the first member of the social group, data about a personal preference of the first member of the social group, data about content viewing history of the first member of the social group, data about a physical setting of the first member of the social group, data related to the social group, and any combination thereof.

* * * * *